United States Patent [19]

Rosa

[11] Patent Number: 4,523,355
[45] Date of Patent: Jun. 18, 1985

[54] FITTING FOR JOINING AN ELONGATE BODY TO A SUPPORT

[75] Inventor: Aristheu A. Rosa, Boacava, Brazil

[73] Assignee: Preformed Line Products Company, Cleveland, Ohio

[21] Appl. No.: 514,806

[22] PCT Filed: Nov. 11, 1982

[86] PCT No.: PCT/BR82/00017

§ 371 Date: Jun. 14, 1983

§ 102(e) Date: Jun. 14, 1983

[87] PCT Pub. No.: WO83/01869

PCT Pub. Date: May 26, 1983

[30] Foreign Application Priority Data

Nov. 11, 1981 [BR] Brazil .................................. 8107318

[51] Int. Cl.$^3$ .............................................. F16G 11/12
[52] U.S. Cl. .................................. 24/115 N; 403/209; 174/179
[58] Field of Search ............... 403/209, 206, 213, 214; 174/173, DIG. 12, 79; 24/131 C, 115 N; 248/63

[56] References Cited

U.S. PATENT DOCUMENTS

| | | | |
|---|---|---|---|
| 3,042,745 | 7/1962 | Williams | 174/173 |
| 3,151,437 | 10/1964 | Schlein | 174/79 UX |
| 3,406,513 | 10/1968 | Butz et al. | 174/173 X |
| 3,588,316 | 6/1971 | Peterson | 248/63 X |

Primary Examiner—Andrew V. Kundrat
Attorney, Agent, or Firm—Fay & Sharpe

[57] ABSTRACT

A fitting for connecting an elongate body such as a cable (19) to a support having a mounting post (11) with a transverse hole (20) adjacent its free end, the fitting comprising a generally U-shaped component formed from a number of strands of wire twisted together, in an open helical formation. The central part of the fitting is twisted more closely, to resemble a wire rope, and is bent to form two-coaxial rings (18) disposed on one side of the plane of the fitting. The rings are joined by a transversally extending midportion (15), which is preferably semicircular in configuration and lies in a plane inclined to the plane of the legs (13, 14) of the fitting.

1 Claim, 8 Drawing Figures

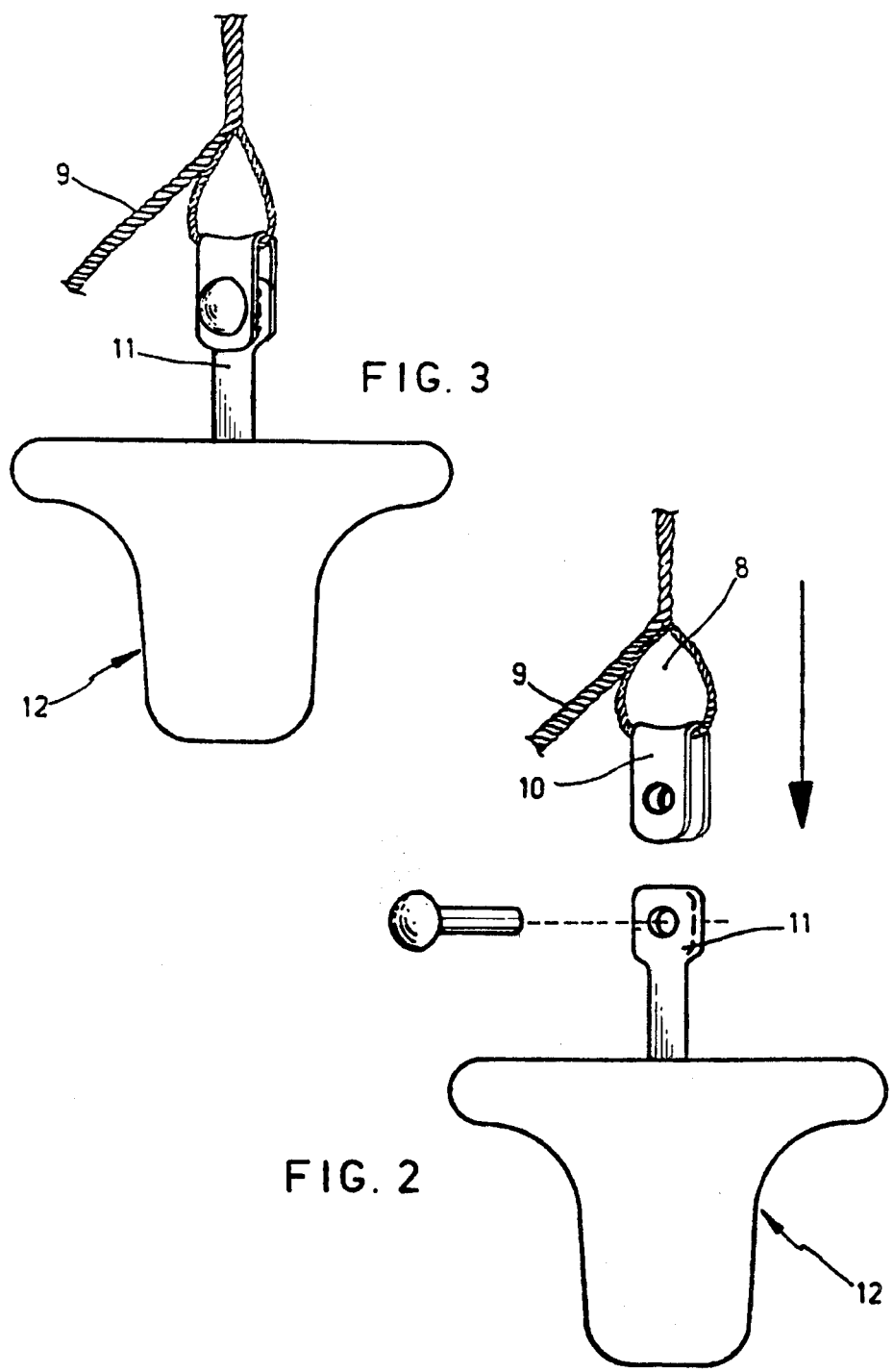

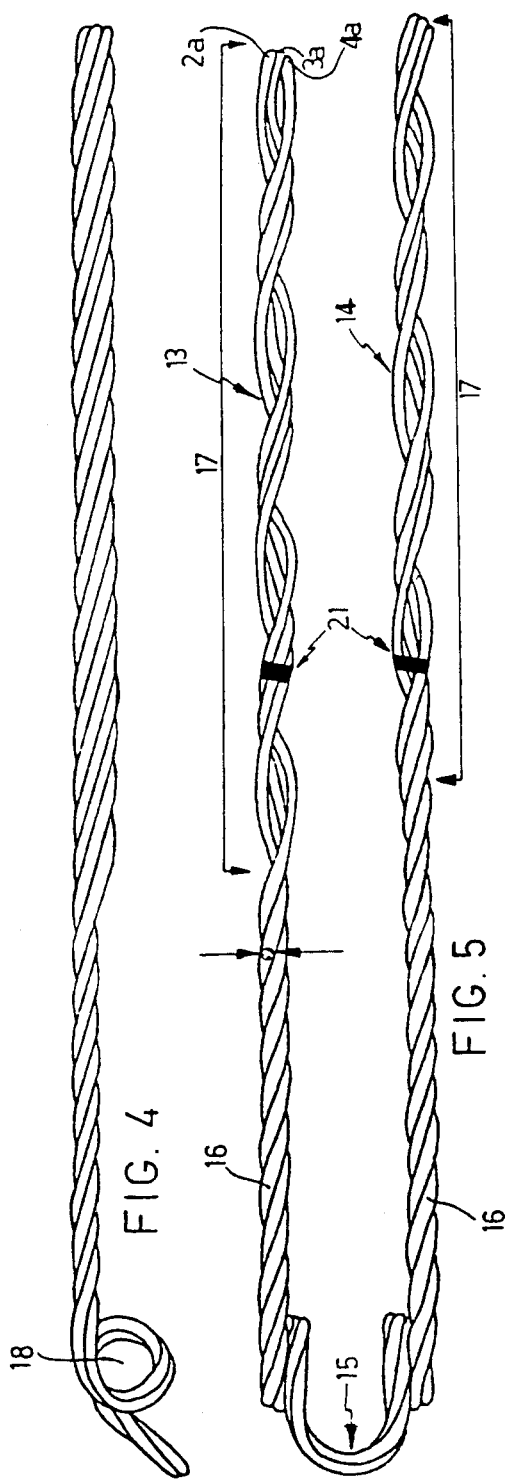
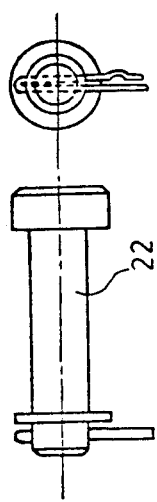

FITTING FOR JOINING AN ELONGATE BODY TO A SUPPORT

The present invention relates to elongate bodies, especially electric power supply cables, and is particularly concerned with providing a fitting for forming a joint between such a body and a support for example a supply cable insulator, adapted and intended for manual application to the cable in situ.

Hitherto, in many cases, electric power lines have been connected to supporting insulators by means of a generally U-shaped element which has its elongate arms twined about the cable to provide a loop fixed thereto, the loop thereafter being secured to the insulator by means of a shackle engaging the loop and a mounting post of the insulator.

This system, although it is an improvement over previous methods, has been found to be expensive as regards the cost of components.

By means of the present invention, a joint between a cable and an insulator may be made without the use of the shackle, and the resulting joint is at least as strong as the previously available joints. It is the object of the present invention, therefore, to provide a fitting capable of joining a cable to a mounting post of an insulator in a secure and inexpensive way.

According to the present invention, a fitting for connecting an elongate body to a support comprises a number of resilient strands twisted together in an open helical formation and formed into a U-shape having a central portion and two substantially parallel legs, and is characterized in that the central portion is given a greater degree of twist than the legs so that it has a rope-like appearance and is bent to form a pair of coaxial rings disposed one at either end of a midportion extending transversely of the fitting.

Preferably, the open helical configuration of the legs defines an internal cylindrical void of a diameter slightly less than that of the element to which the fitting is to be applied. The pitch length of the helix is such that the fitting may be applied without exceeding the elastic limit of the strands.

An embodiment of the present invention will now be described in contrast to a known cable fitting, with reference to the accompanying drawings, in which:

FIGS. 2 and 3 illustrate the use of the known fitting;

FIGS. 4 and 5 show the fitting of the present invention;

FIG. 6 shows a retaining pin assembly used with the present fitting; and

Figure 1:
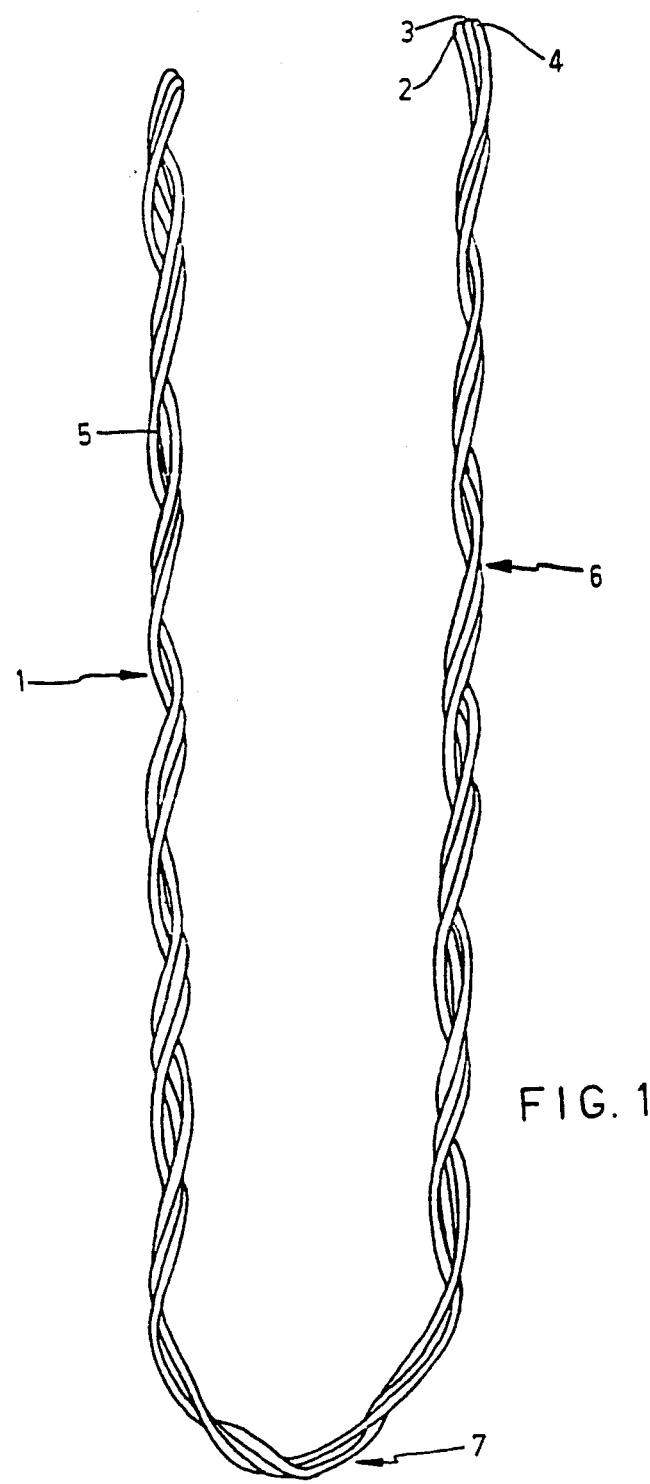
FIG. 1 shows the known cable fitting, in plan view.

Referring to FIGS. 1 to 3, an existing cable fitting is shown which comprises a U-shape element 1 formed of three strands of wire 2, 3, 4, the three strands being twisted together in an open helical formation and then bent to form a U-shape. The strands are held together by a coating of varnish or lacquer or the like.

In use, the two legs 5 and 6 of the fitting are twisted round a cable 9, so as to wrap round the cable without overlapping. The curved part 7 of the fitting then forms a loop 8 attached to the cable 9 by means of the legs 5 and 6, as seen in FIG. 2.

A shackle 10 is then used to connect the loop 8 with a mounting post 11 of an insulator 12, the insulator being situated atop a supply pole or pylon.

The fitting of the present invention, as seen in FIGS. 4 and 5, is similar in appearance to the prior device, but has two important differences which significantly improve its operability and economy.

As can be seen, the fitting is generally U-shaped and has two elongated legs 13 and 14, joined by a transversely extending midportion 15.

The fitting is formed from three twisted wire strands 2a, 3a and 4a, and doubled to form the U-shape. Before doubling, however, the central part of the fitting is twisted further, so that the fitting has a central part 16 including the midportion 15 in which the three strands are tightly twisted, like a wire rope, and two extremities 17 in which the wire strands are in the form of a open helix. It is important also to note that the two helices are out of phase axially by half of their pitch when the fitting is in its doubled condition.

The second important difference is that, adjacent the midportion 15, the fitting is formed into two coaxial rings 18 extending generally at 90° to the plane containing the legs 13, 14. The midportion 15 is preferably of planar, semicircular configuration and most preferably lies in a plane inclined to the plane of the legs 13, 14.

Figures 7, 8:
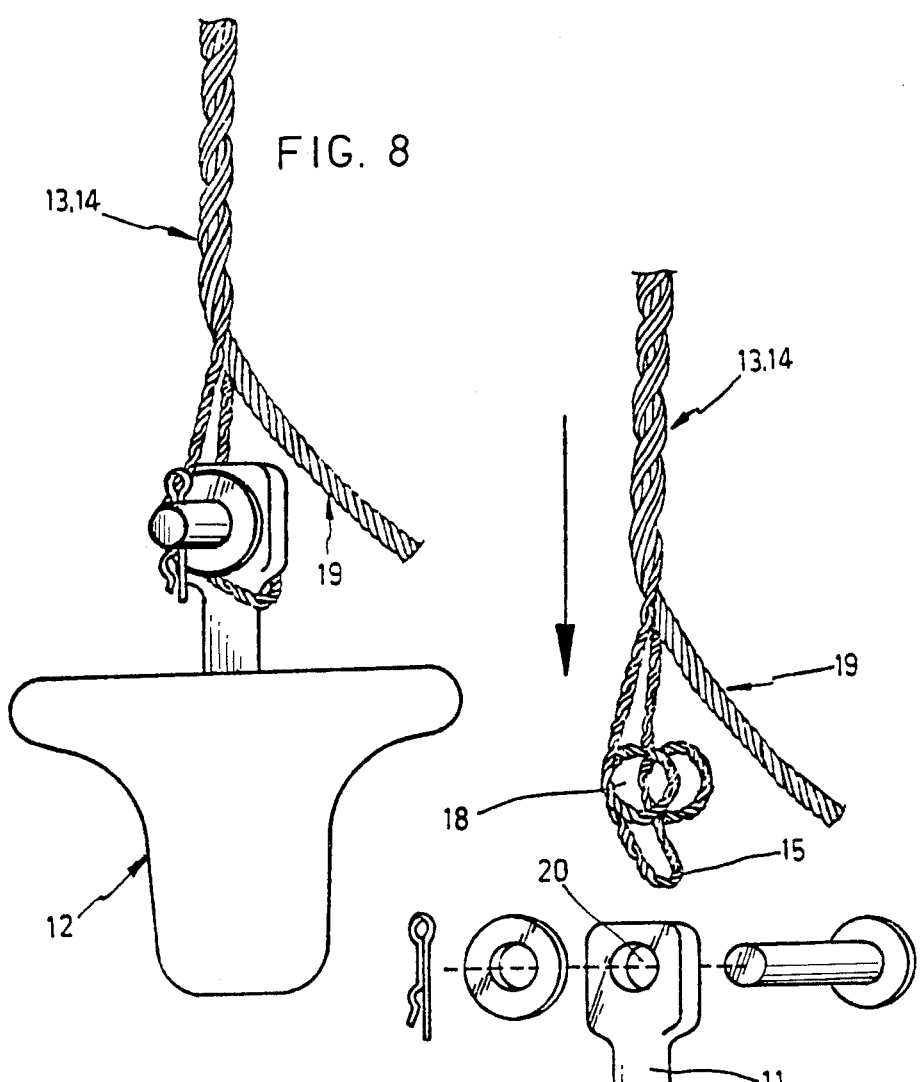
FIG. 7 and 8 illustrate the use of the present fitting.

In use, as seen in FIGS. 7 and 8, midportion 15 of the central part 16 of the fitting is offered up to the mounting post 11 of an insulator 12, so that the side of the mounting post rests on the inner surface of curved midportion 15, and rings 18 are aligned with a hole 20 through the end of the mounting post 11, the hole 20 being positioned between rings 18.

To complete the assembly, a headed pin 22, shown in FIG. 6, is passed through rings 18 and hole 20, and a retaining washer and split pin are applied.

The cable is then pulled to its desired tension, and the legs 13, 14 of the fitting are twined round the cable so that a secure grip is achieved. A mark 21 on each leg may be provided to indicate the minimum extent to which the legs must be twined about the cable.

As has now become clear, central part 16 advantageously has its midportion 15 inclined to the plane of the legs fitting in order that the mounting post may be assembled to the fitting in such a way that the unstressed and stressed positions of the component are identical or substantially so.

It will be clear to those cognizant with the art that the contact between the central part and the mounting post will prevent high tensions in the cable 19 from unwinding the rings 18.

The rings 18 may be color-coded to identify the size of retaining pin to be used, and the legs may bear markings to indicate the tolerated cable size range.

Generally the fittings will be formed of metal, preferably aluminized, copper-coated, or galvanised steel, to reduce corrosion problems. Plastics materials, either alone or reinforced, may also be used in lighter load applications.

While the fitting has been described in relation to power supply cables, it should also be understood that the invention is equally applicable to the fixing of any elongate body to a support or anchorage.

I claim:

1. Apparatus for coupling an elongate body to a support comprising: a generally U-shaped fitting having a midportion extending transversely between two substantially parallel legs, said fitting having a central portion inwardly of the extremities of said legs which includes said midportion, said fitting being bent to form a pair of coaxial rings disposed one at either end of said midportion and extending generally at 90° to the plane containing said legs, said midportion being of generally planar curved configuration and lying in a plane inclined to the plane containing said legs, said fitting being formed of a plurality of resilient strands twisted together, said strands in said central portion having a greater degree of twist than the extremities of said legs so as to have a rope-like appearance, said strands in the extremities of said legs being twisted together in an open helical configuration with the helix on one leg being axially out of phase with the helix on the other leg by approximately one-half their pitch, and the extremities of said legs being grippingly twinable around an elongate body to define the sole means for attaching the elongate body to the fitting and thereby coupling the elongate body to a support to which the fitting is attachable by said rings.

* * * * *